E. W. LAISNÉ.
LENSES FOR EYEGLASSES AND SPECTACLES.
APPLICATION FILED OCT. 26, 1914.
1,144,853.
Patented June 29, 1915.
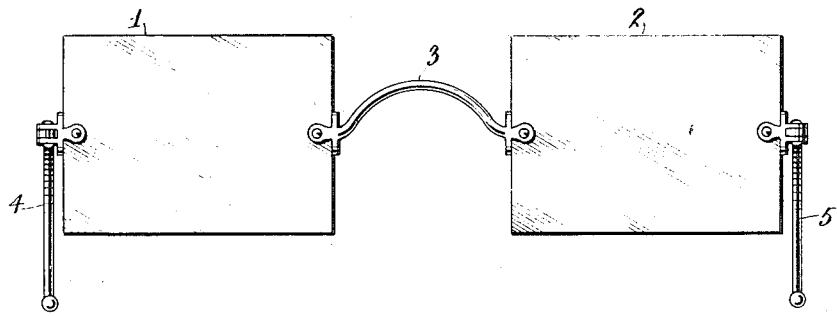
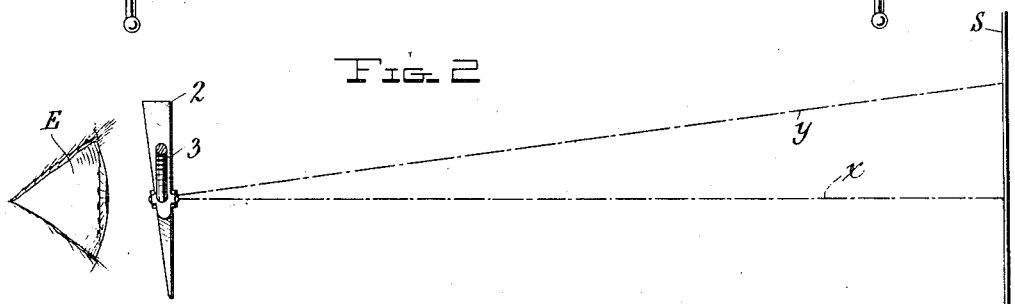
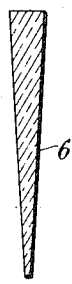 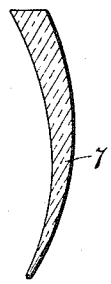
    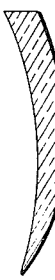 
Witnesses
Inventor
Eugene W. Laisné,
by
Attorney.

UNITED STATES PATENT OFFICE.

EUGÈNE W. LAISNÉ, OF FRESNO, CALIFORNIA.

LENSES FOR EYEGLASSES AND SPECTACLES.

1,144,853. Specification of Letters Patent. Patented June 29, 1915.

Application filed October 26, 1914. Serial No. 868,746.

*To all whom it may concern:*

Be it known that I, EUGÈNE W. LAISNÉ, a citizen of the United States, residing at Fresno, in the county of Fresno and State of California, have invented new and useful Improvements in Lenses for Eyeglasses and Spectacles, of which the following is a specification.

My present invention relates to improvements in eyeglasses or spectacles and more especially to the lenses thereof, and the object of the invention is to provide lenses for eyeglasses or spectacles which will relieve the wearer of eye-strain, headache, or other discomfort, during or as a result of viewing motion pictures, the invention comprising, generally speaking, a pair of prismatic lenses adapted to be supported by a suitable mounting before the eyes of the wearer, the bases of the prisms being uppermost whereby the light rays are bent or refracted in a manner which will diminish or avoid the necessity of rotating the eyes upwardly to view the screen on which the pictures are projected and which is usually located above the level of the eyes.

In the accompanying drawing:—Figure 1 is a front elevation of a pair of spectacles or eyeglasses fitted with lenses embodying the present invention; Fig. 2 is a diagrammatic view showing the manner in which the light rays are bent or refracted by the prismatic lenses; Figs. 3 to 10 inclusive are sectional views of varying forms of prismatic lenses embodying the present invention.

Similar parts are designated by the same reference characters in the several views.

In the exhibition of motion pictures, the pictures are projected upon a screen which is usually located above the level of the eyes of the observer, requiring the observer to either tilt the head upwardly or to rotate the eyes upwardly to view the pictures on the screen. The maintenance of the eyes in the upwardly rotated position occasions strain upon the superior rectus muscles, causing smarting of the eyes, headaches, and other discomfort. The present invention provides lenses for eyeglasses or spectacles which enable the observer to view the pictures on the screen while the eyes are in normal position, that is, without the necessity of rotating the eyes upwardly, and it comprises a pair of prismatic lenses 1 and 2 corresponding to the left and right eyes, the bases of both lenses being uppermost.

The lenses may be supported before the eyes of the observer by any suitable means and may be worn either separately or together with the eyeglasses or spectacles which correct optical defects of the eyes. In the example shown, a mounting is provided which comprises a bridge 3 which connects the lenses and a pair of temples 4 and 5, the mounting thus provided resembling the usual spectacles.

Fig. 2 shows diagrammatically the normal line of vision and the line of vision as bent or deflected by the prismatic lenses of the present invention. In this figure E represents one of the eyes of the observer, S represents a vertical screen, $x$ represents the normal line of vision, and $y$ the bent or upwardly deflected line of vision, it being evident that the upwardly bent or deflected line of vision enables the observer to view a screen above the eye level without rotating the eyes upwardly.

Figs. 3 to 10 inclusive show various forms of prismatic lenses which may be used in carrying out the present invention. Fig. 3 shows a plano-prism 6, Fig. 4 shows a plano-meniscus prism 7, Fig. 5 shows a plano-convex prism 8, Fig. 6 shows a double convex prism 9, Fig. 7 a plano-concave prism 10, Fig. 8 a double concave prism 11, Fig. 9 a meniscus convex prism 12, and Fig. 10 a meniscus concave prism 13. Any of these lenses may be used in carrying out the invention, according to the condition of the eyes of the wearer or other reasons, and the lenses may be either clear or tinted, as may be desired.

I claim as my invention:—

1. In eyeglasses or spectacles, a pair of prismatic lenses having their bases uppermost and operative to deflect the lines of vision of both eyes of the wearer upwardly from the normal.

2. In eyeglasses or spectacles, a pair of prismatic lenses, both lenses having their bases uppermost, and a mounting for supporting the lenses in such position before the eyes of the wearer.

In testimony whereof I have hereunto set my hand in presence of two subscribing witnesses.

EUGÉNE W. LAISNÉ.

Witnesses:
E. G. HUGHSON,
MARY M. ELDER.

Copies of this patent may be obtained for five cents each, by addressing the "Commissioner of Patents, Washington, D. C."